United States Patent
Cheng

(10) Patent No.: US 7,080,995 B2
(45) Date of Patent: Jul. 25, 2006

(54) ELECTRICAL CARD CONNECTOR HAVING DUSTPROOF DEVICE

(75) Inventor: Yung Chang Cheng, Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 11/001,895

(22) Filed: Dec. 1, 2004

(65) Prior Publication Data
US 2005/0142934 A1  Jun. 30, 2005

(30) Foreign Application Priority Data
Dec. 26, 2003 (TW) .............................. 92222752 U

(51) Int. Cl.
*H01R 13/44* (2006.01)
(52) U.S. Cl. ..................................................... 439/138
(58) Field of Classification Search ................ 439/138, 439/142, 141, 139
See application file for complete search history.

(56) References Cited

U.S. PATENT DOCUMENTS

| 6,095,862 | A  | * | 8/2000 | Doye et al. .................. 439/607 |
| 6,120,322 | A  | * | 9/2000 | Ho et al. ................... 439/541.5 |
| 6,267,608 | B1 | * | 7/2001 | Yagi ............................ 439/142 |
| 6,269,005 | B1 |   | 7/2001 | Tung et al. |
| 6,368,122 | B1 | * | 4/2002 | Billman ....................... 439/138 |
| 6,454,580 | B1 | * | 9/2002 | Hwang ........................ 439/138 |
| 6,558,175 | B1 |   | 5/2003 | Yu |

* cited by examiner

*Primary Examiner*—Phuong Dinh
(74) *Attorney, Agent, or Firm*—Wei Te Chung

(57) ABSTRACT

An electrical card connector (1) is provided for receiving an electrical card. The connector comprises an insulative body (10), a number of contacts (20), a cover and a door device (50). The cover defines a receiving port for the insertion/withdrawal of the electrical card into/out and at least one gap (422) on the rear edge thereof. The door device assembles on the cover and shield the receiving port. The door device is formed with at least one projection (522) on the upper edge thereof for engaging with the gap of the cover to prevent the door device from moving laterally with respect to the cover.

12 Claims, 4 Drawing Sheets

ELECTRICAL CARD CONNECTOR HAVING DUSTPROOF DEVICE

BACKGROUND OF THE INVENTION

1. Field of the Invention

The present invention is generally related to an electrical card connector, and more particularly, to an electrical card connector having a dustproof device.

2. Description of Related Art

Due to continuing trend toward miniaturization and multifunction by notebook, more and more accessional electrical cards are needed to enlarge and enhance the functions of the notebooks. So, the electrical card connectors, which are specially used for connecting various electrical cards, are widely applied to the notebooks. Sometimes the notebook may work in a dust-laden circumstance, then a plurality of contaminants such as dust will enter into the interior of the notebook from a receiving port of the electrical card connector through which an electrical card insertion/withdrawal into/out. The contaminants may pollute the internal environment of the notebooks and cause the notebooks to work abnormally. Therefore, the electrical card connector with a dustproof device is desired to overcome the problem mentioned above.

U.S. Pat. No. 6,120,322 discloses an electrical card connector device with a dustproof device, a drawing of which is adapted herein as FIG. 4. Referring to FIG. 4, the electrical card connector device 1 comprises a connector assembly 3 formed with two card connectors 4 stacked on each other, and a casing 2 for enclosing the connector assembly 3. Each card connector 4 has a receiving port through which the electrical cards are respectively received into the connector assembly 3. The casing 2 has a cover plate 20, an upper door panel 22 and a lower door panel 23. The cover plate is formed with a pair of front extensions 212, which has two sets of pivot holes 214, 217 and 215, 216 respectively provided thereon. The upper door panel 22 has two pivot pins 221, 222 rotatably received in the pivot holes 216, 214 of the extension 212, and the lower door panel 23 has two pivot pins 231, 232 rotatably received in the pivot holes 215, 217 of the extension 212. Thereby the upper door panel 22 and lower door panel 23 can rotate with respect to the casing 2, and forms a closed position at which the upper door panel 22 and the lower door panel 23 block the card receiving ports of the card connectors 4 and an open position at which the receiving ports of the card connectors 4 is exposed. Obviously the connector device 1 can prevent dust from entering into the interior of the notebook via the upper door panel 22 and the lower door panel 23. However, when the connector device 1 is shaken or effected by outside force, one end of the pivot pins 221, 222, 231, 232 of the upper door panel 22 and the lower door panel 23 may detach from the corresponding pivot holes 214, 217, 215,216, and then the upper or lower door panels 22, 23 will open and lose the function of dustproof.

Hence, an electrical card connector with an improved dustproof device is highly desired to overcome the aforementioned disadvantages of the prior art.

SUMMARY OF THE INVENTION

Accordingly, an object of the present invention is to provide an electrical card connector having a improved dustproof device.

To achieve the above abject, an electrical card connector in accordance with the present invention comprises an insulative body, a plurality of contacts received in the insulative body, a cover assembled on the insulative body, an ejector for withdrawing an electrical card and a dustproof device. The insulative body is formed with a pair of guide racks extending backwardly from two opposite ends thereof to define a space therebetween for accommodating an electrical card. The cover defines a receiving port for the insertion/withdrawal of the electrical card into/out, and a pair of pivot holes on the two opposite ends of the receiving port. The door device has a pair of pivot pins, and assembles on the cover by engaging the pivot pins with the pivot holes on the cover respectively for shielding the receiving port. Furthermore the cover has at least one gap, and the door device has at least one projection engaging with the gap on the cover for preventing the door device from moving along the pivot pins with respect to the cover.

Other objects, advantages and novel features of the present invention will be drawn from the following detailed description of a preferred embodiment of the present invention with attached drawings:

DETAILED DESCRIPTION OF THE INVENTION

Reference will now be made in detail to the preferred embodiment of the present invention.

Figure 1:
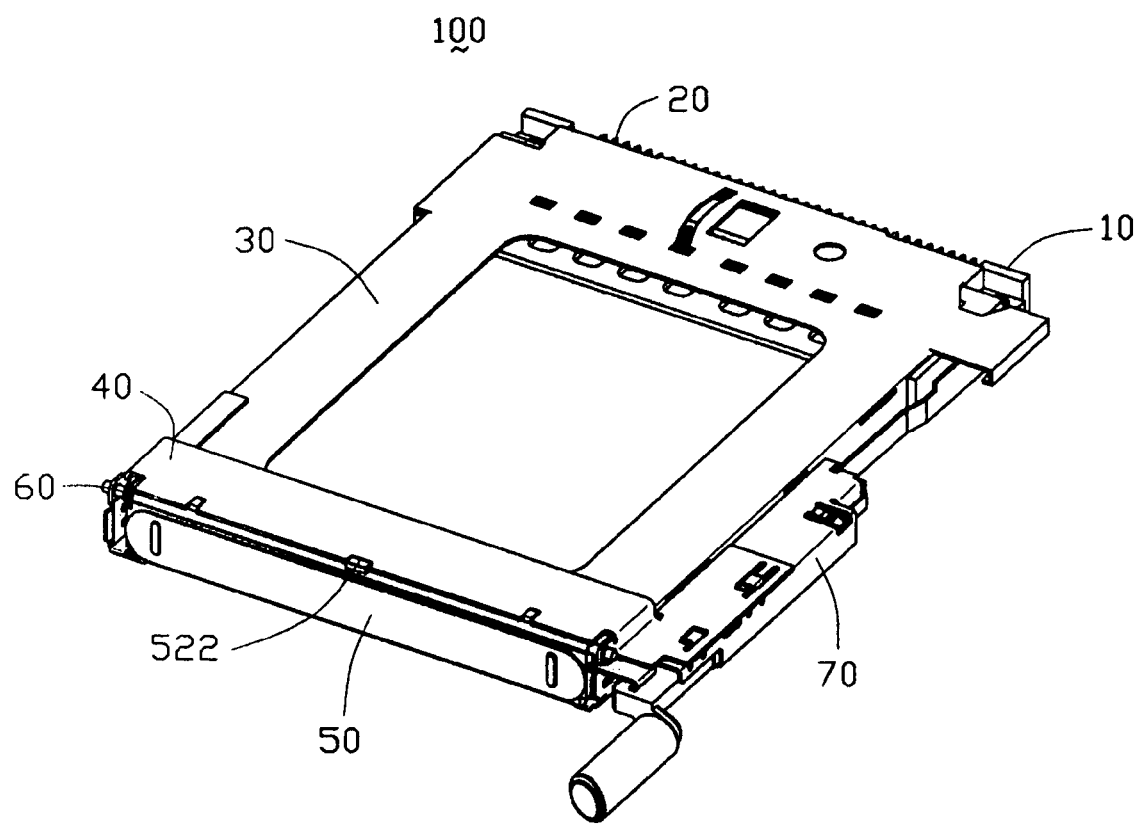
FIG. 1 is a perspective view of an electrical card connector in accordance with the present invention.

Referring to FIG. 1, an electrical card connector 100 in accordance with the present invention comprises an elongated insulative body 10, a plurality of contacts 20 received in the insulative body, a cover including a first shielding plate 30 and a second shielding plate 40, a door device 50, a torsional spring 60 and an ejector 70.

Figure 2:
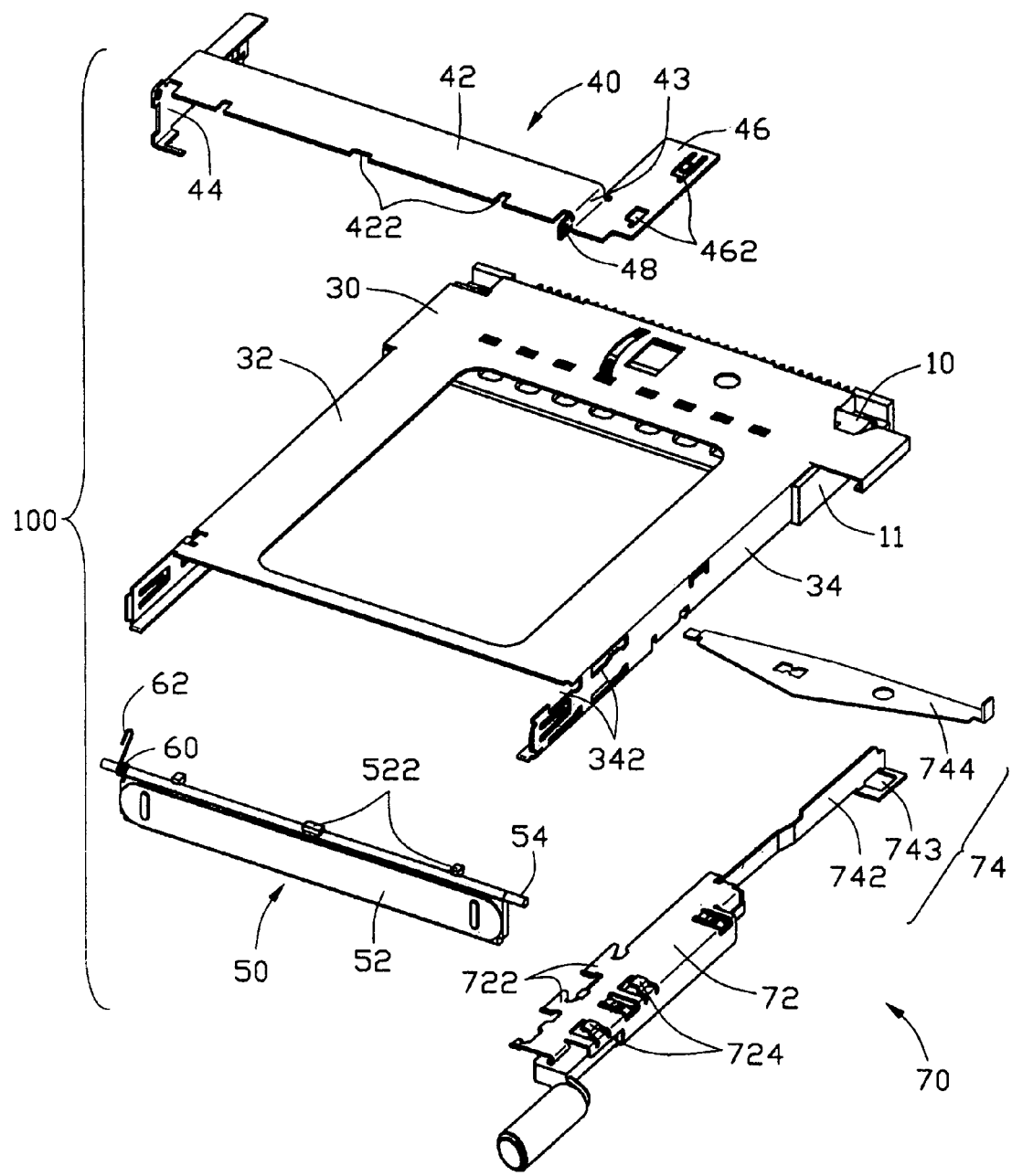
FIG. 2 is an exploded, perspective view of the card electrical connector shown in FIG. 1.
Figure 3:
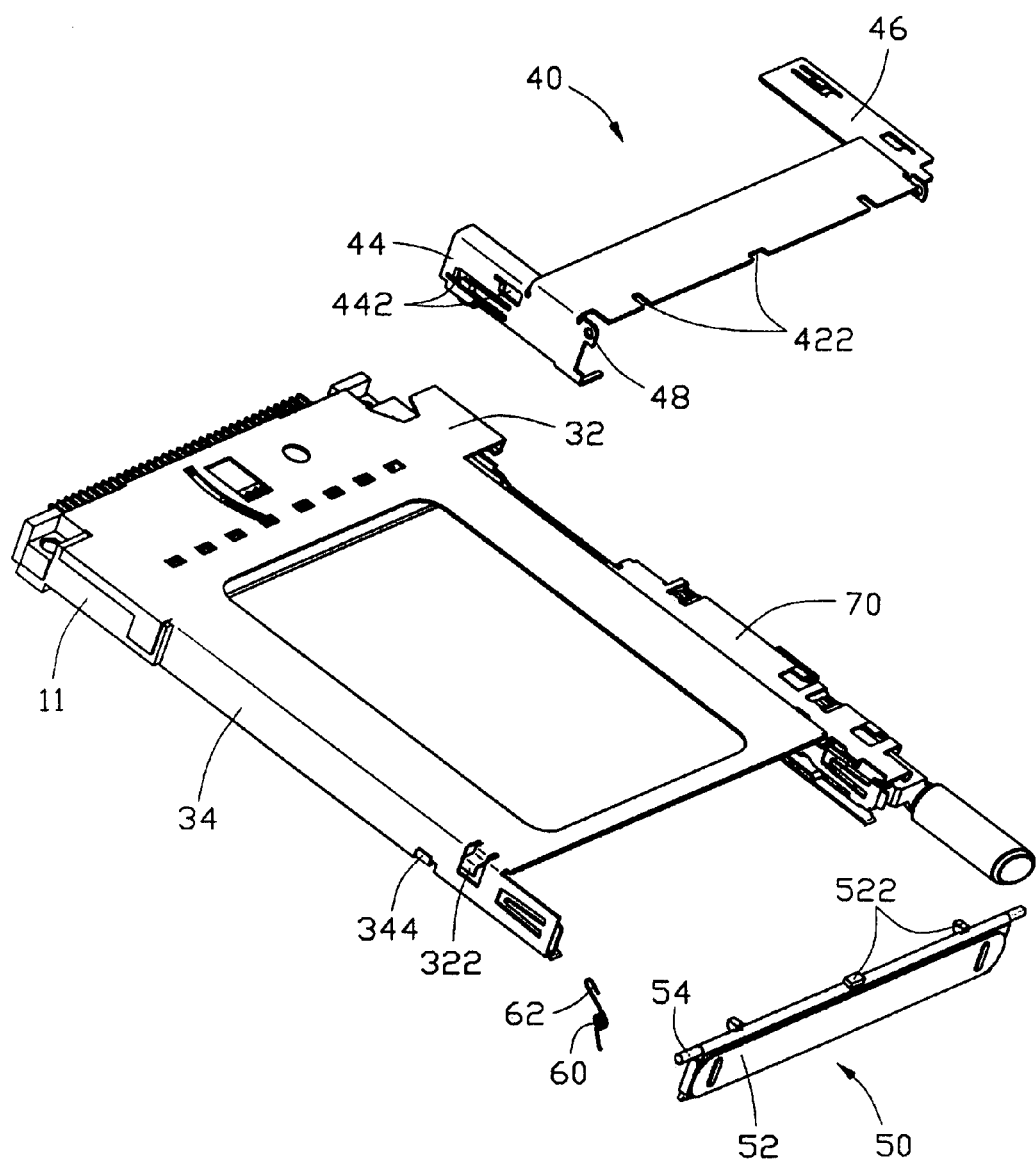
FIG. 3 is an exploded, perspective view of the card electrical connector shown in FIG. 2, taken from another aspect with an ejector assembled thereon.
Figure 4:
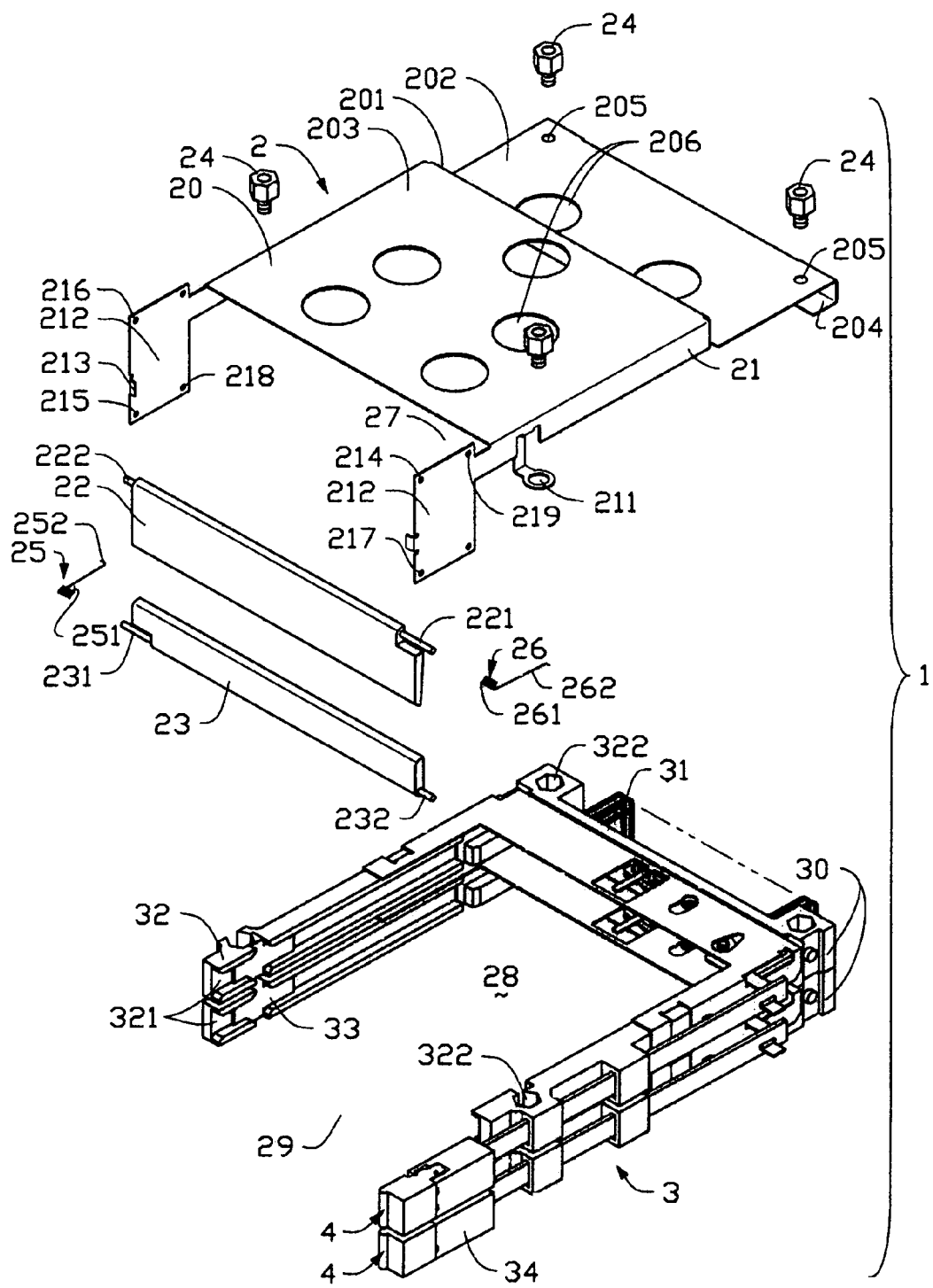
FIG. 4 is an exploded, perspective view of a conventional electrical connector.

Referring to FIG. 2 and FIG. 3, the elongated insulative body 10 is formed with a pair of guide racks 11 extending backwardly from two opposite ends of the elongated insulative body 10.

The first shielding plate 30 comprises a base plate 32 with a front end secured to a top surface of the insulted body 10 and a pair of sidewalls 34 vertically extending from opposite side edges of the base plate 32, respectively. The sidewalls 34 are attached to corresponding guide racks 11. A receiving space is defined between the first shielding plate 30 and the insulative body for accommodating an electrical card (not shown). The contacts 20 are received in the insulative body 10 with a tail thereof extending into the receiving space for electrically connecting. One sidewall 34 defines a plurality of grooves 342 and the other has at least one clasp 344. In addition, the base plate 32 is formed with a tab 322 extending out of the sidewall 34.

The second shielding plate 40 is secured to a rear end of the first shielding plate 30 to define a rectangle receiving port communicating with the space for the insertion/withdrawal of the electrical card into/out. The second shielding plate 40 comprises a rectangle base 42, a vertical sidewall 44 extending downwardly from one side edge thereof, an interim portion 43 extending downwardly from the other side edge thereof, and a horizontal engagement portion 46 extending laterally from the interim portion 43. The vertical sidewall 44 defines a plurality of slots 442, and the horizontal engagement portion 46 defines a plurality of notches 462. The vertical sidewall 44 is attached onto corresponding sidewall 34 of the first shielding plate 30 by means of the slots 442 engaging with the tabs 322 and clasp 344 of the first shielding plate 30. It should be noted that the first shielding plate 30 is able to be integrated with the second shielding plate 40. Furthermore, a pair of pivot holes 48 are defined respectively on a rear edge of the sidewall 44 and the interim portion 43 for engaging with the door device 50. The pivot holes 48 have a same axis which is parallel to a rear edge of the rectangle base 42. The rectangle base 42 defines at least one gap 422 on the rear edge thereof, which is communicating with the receiving port.

The door device 50 has a rectangle board 52 and a pair of pivot pins 54 extending laterally from the two opposite end of the up edges of the rectangle board 52. The board 52 is received in and shields the receiving port via the pivot pins 54 rotatably received in the pivot holes 48 of the second shielding 40. The rectangle board 52 is formed with at least one projection 522 extruding along the up edge of the rectangle board 52 for fitly engaging with the gap 422 along the rear edge of the second shielding plate 40. The dimension of the projection 522 is accordant with the gap's 442 to abut against the sidewall of the gap 442 for preventing the door device 50 from moving along the axis of the pivot holes 48 and disengaging with the second shielding plate 40.

A torsional spring 60 is secured to one of the pivot pins 54 of the door device 50. The torsional spring 60 has two free ends. When the torsional spring 60 is assembled, one of the free ends abuts against an inner surface of the base 42, and the other free end abuts against a surface of the door device 50. When the electrical card connector 100 is leisure, the door device 50 will keep closed without swinging in a mating direction of the electrical card, and when the electrical card is withdrawing out of the electrical card connector 100, the door device 50 turns down automatically to shield the receiving port.

The ejector 70 comprises an actuation section 72 and an ejection section 74. The ejection section 74 has a driven member 742 and an ejection rod 744 sandwiched between the housing 10 and the first shielding plate 30. The driven member 742 connects with the actuation portion 72 at an end thereof and defines a limit hole 743 on the other end for the ejection rod 744 rotataly connecting with the driven member 742. As an operator exerts a force on the actuation section 72, the ejection rob 744 rotates and ejects out of the electronic card received in the electrical card connector 100. Furthermore, the actuation section 72 is formed with a plurality of extrusions 722 on a side edge for engaging with the corresponding grooves 342 on the sidewall 34 of the first shielding plate 30, and a plurality of spring tabs 724 on an up surface thereof for engaging with the notches 462 on the engaging portion 46 of the second shielding plate 40. Therefore, the ejector 70 is fixed to the first shielding plate 30 and the second shielding plate 40.

During inserting the electrical card into the electrical card connector 100, the electrical card push the door device 50 to inwardly rotate around the axis of the pivot holes and then pass through the receiving port. Simultaneously, the torsional spring 60 will be elastically deformed due to the rotation of the door device. Once the electrical card is withdrawn out from the electrical card connector 100, the door device 50 will turn down and shield the receiving port due to being activated by the resilience of the torsional spring 60. Furthermore, the projections 522 of the door device 50 fitly pivot engages with the gap 422 of the second shielding plate 40, so the door device 50 can be prevented from moving along the extending direction of the pivots 54 with respect to the second shielding plate 40.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An electrical card connector comprising:
   an insulative body;
   a plurality of contacts received in the insulative body;
   a cover assembled on the insulative body, the cover defining a receiving port for the insertion/withdrawal of an electrical card into/out, a pair of opposite pivot holes located on opposite sides of the receiving port and at least one gap on a rear edge of a top plate thereof, the pivot holes defining an axis; and
   a door device having a board and a pair of pivot pins extending laterally from opposite ends of the board, the pivot pins being rotatably received in corresponding pivot holes with the board shielding the receiving port, the board being formed with at least one projection engageble with the gap of the cover for preventing the door device from floating along the axis of the pivot holes when the door is closed.

2. The electrical card connector as claimed in claim 1, further comprising a torsional spring assembled on one of the pivot pins to keep the door device closed when the electrical card connector receive an electrical card.

3. The electrical card connector as claimed in claim 2, wherein the cover comprises a first shielding plate and a second shielding plate assembled to the first shielding plate.

4. The electrical card connector as claimed in claim 3, wherein the second shielding plate is formed with the pivot holes respectively on two opposite edges thereof.

5. The electrical card connector as claimed in claim 4, wherein the torsional spring has two free ends, one of the ends abuts against the lower surface of the second shielding plate, and the other abuts against the surface of the door device which faces the receiving port.

6. The electrical card connector as claimed in claim 5, wherein the first shielding plate comprises a base and two sidewalls with a plurality of tabs, the second shielding plate comprises a base and a sidewall extending downwardly and forwardly from one side of the base, the sidewall of the second shielding plate defines a plurality of slots engaging with the tabs of the first shielding plate.

7. The electrical card connector as claimed in claim 6, further comprising an ejector, the ejector comprises an actuation section and an ejection section.

8. An electrical card connector comprising:
   an insulative body;
   a plurality of contacts received in the insulative body;
   a cover assembled on the insulative body, the cover defining a receiving port for receipt of an electronic card therein;
   a door device having a board pivotally assembled to the cover to shield the receiving port and defining a pivot axis in a lateral direction; and complementary interengaging devices formed on said door and a horizontal plate of said cover and constantly engaged with each other during rotation of the door to prevent the door moveable relative to the cover in said lateral direction.

9. The connector as claimed in claim 8, wherein one of said door and said cover defines a recess and the other of said door and said cover define a protrusion received in said recess.

10. The connector as claimed in claim 9, wherein both said recess and said protrusion are located in a middle portion of the connector in said lateral direction.

11. An electrical card connector comprising:
an insulative body, received a plurality of contacts;
a cover assembled on the insulative body, the cover defining a receiving port for receipt of an electronic card therein;
a door device having a board pivotally assembled to the cover for shielding the receiving port and defining a pivot axis in a lateral direction; and
complementary interengaging devices formed on the board of the door device and the cover and engaged with each other to prevent the door device from moving relative to said cover in said lateral direction; wherein said interengaging devices includes at least one projection and at least one recess both of which extend in a front-to-back direction, which is perpendicular to the lateral direction, to compliantly couple to each other.

12. The electrical card connector as claimed in claim 11, wherein the cover comprises a first shielding plate assembled to the insulative body and a second shielding plate assembled to the first shielding plate, the complementary interengaging devices are formed on the door device and the second shielding plate.

* * * * *